Aug. 16, 1949.  G. P. LOUCKS  2,479,127
ELECTRODE HOLDER FOR ARC WELDING
Filed Aug. 7, 1946
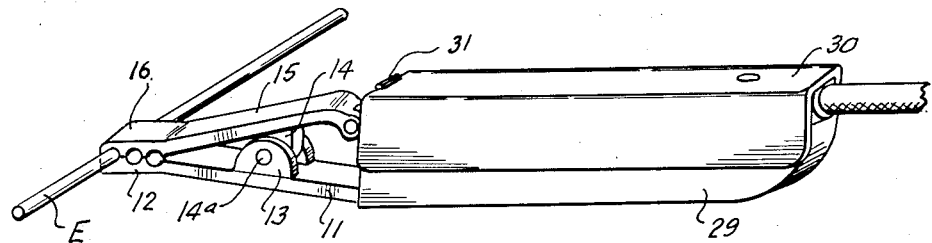
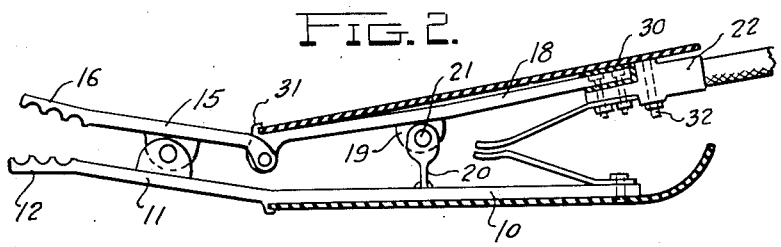
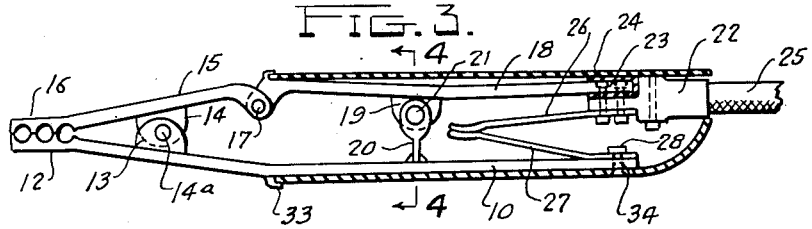
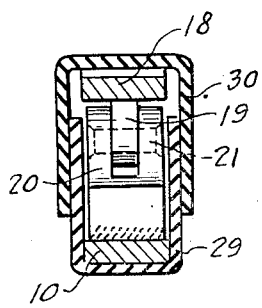
INVENTOR.
George P. Loucks
BY
*Malcolm W. Fraser*
ATTORNEY Patented Aug. 16, 1949

2,479,127

UNITED STATES PATENT OFFICE 2,479,127

ELECTRODE HOLDER FOR ARC WELDING

George P. Loucks, Toledo, Ohio

Application August 7, 1946, Serial No. 688,904

3 Claims. (Cl. 219—8)

This invention relates to electrode holders but particularly to electrode holders of the type in which the welding wire or rod is gripped between clamping jaws.

Most electrode holders or tongs of this type are provided with projecting arms, levers or handles or other protruding parts which are decidely objectionable particularly when the tongs are moved from place to place. This is ordinarily accomplished by pulling on the cable which is attached to the tongs with the tongs sliding along the floor or other supporting surface. These projecting arms catch in objects and are a definite source of annoyance.

Heretofore, most electrode holders of this type are equipped with springs which urge the electrode engaging jaws into clamping relation, but due to the exceedingly high temperatures generated during welding, these springs soon lose their temper, or for one reason or another become unsatisfactory and fail to perform their function.

An object of this invention is to overcome the above difficulties by producing a simple and efficient electrode holder for arc welding which is so constructed and arranged that the exterior is free from projecting lever handles or the like, thereby enabling the tool to be slid from place to place without interference, the holder or tongs being free from springs, thereby obviating the difficulty above mentioned.

Another object is to produce a new and improved electrode holder having a toggle action so that the clamping jaws are positively moved either to clamped or unclamped position and when in clamped position, an electrical contact having been automatically made for delivering current to the electrode.

A further object is to produce an electrode holder having the new and improved features of construction, arrangement and operation hereinafter more fully described, and for purposes of illustration but not of limitation, an embodiment of the invention is shown on the accompanying drawings, in which Figure 1 is a rear perspective view of the electrode holder showing the clamping jaws in clamping position;

Figure 2 is a side elevation of the electrode holder with the clamping jaws in open position and with the insulating sheath or covering shown in section;

Figure 3 is a side elevation similar to Figure 2, but showing the clamping jaws in closed position; and Figure 4 is an enlarged sectional view substantially on the line 4—4 of Figure 3.

The illustrated embodiment of the invention comprises an electrode holder having a lower arm 10, the end portion 11 of which is inclined upwardly and is formed with an integral clamping jaw 12. Formed on the upper side of the arm extension 11 about midway of the length thereof is a pair of brackets 13 between which is disposed a bracket 14 integral with the under side of a link arm 15 which is formed at its outer end with a jaw 16 to cooperate with the jaw 12 for clamping therebetween an electrode E. The brackets 13 and 14 are pivotally connected by a pivot pin 14a. The rear end of the link arm 15 is downwardly inclined and is pivotally connected by a pin 17 to an arm 18. Formed on the under side of the arm 18 is a bracket 19 which is pivotally connected to a bracket 20 by a pin 21, the bracket 20 rising from the upper side of the lower arm 10.

The link arm 15 and arm 18 provide a pair of toggle links, and it will be manifest that by pressing the arms 10 and 18 together on the inner side of the pivot pin 21, the jaw 16 will be positively moved into engagement with the jaw 12. In order to open the jaws, the arms 10 and 18 are engaged outwardly of or in advance of the pivot pin 21, thereby to break the toggle and cause the jaw 16 to move away from the jaw 12 to the position shown in Figure 2. Thus the jaws are either in their open position or in their closed position and are frictionally held in one position or the other due to the toggle action. The inner end of the arm 18 carries a fitting 22 which is secured thereto by bolt and nut assemblies 23, suitable insulating material 24 being interposed between the arm and the fitting electrically to insulate the fitting from the arm. A cable 25 is suitably connected to the fitting 22 for delivering current to a spring metal switch arm 26. The outer end of the switch arm 26 is engageable with a similar arm 27 which is secured by a bolt 28 to the inner end portion of the arm 10. As shown in Figure 3, the free ends of the switch arms 26 and 27 are brought into engagement when the clamping jaw 12 and 16 are in clamping position. As shown in Figure 2, when the jaws 12 and 16 are opened or separated from each other by breaking of the toggle, the switch arms are separated from each other so that current will not flow to the electrode.

The arms 10 and 18 are covered by telescoping fiber sheaths 29 and 30. The upper sheath 30 engages under a hook member 31 at its front end and is secured by a bolt 32 at the rear end engaging the fitting 22. The lower fiber sheath 29 is similarly connected to the arm 10, the front end engaging under a hook 33 and the rear end being secured by a bolt 34. The telescoping sheaths 29 and 30 are of fiber, forming an effective insulation and also providing a suitable gripping surface.

It is to be understood that numerous changes in details of construction, arrangement and operation may be effected without departing from the spirit of the invention especially as defined in the appended claims.

I claim:

1. An electrode holder for arc welding comprising a rigid metal arm having an electrode-engaging jaw at one end, a relatively short metal link arm having at its outer end a jaw to cooperate with said first jaw, a pivotal mounting arranged intermediate the ends of said short link arm and connecting same to said rigid arm, a second link arm pivoted to the inner end of said first link arm, a pivotal mounting arranged intermediate the ends of said second link arm and connecting same to said rigid arm, whereby said link arms cooperate to form a toggle thereby positively to maintain the jaws in operative engaging position or in inoperative spread-apart position, switch means for making and breaking a circuit upon making and breaking the toggle respectively, a hook at the outer end of said second link arm, a hook on said rigid arm correspondingly arranged to said first link, a pair of sheaths U-shaped in cross section on said second link arm and said rigid arm having their outer ends engaging beneath said hooks respectively, and means for securing the opposite end portions of said sheaths respectively, said sheaths being of insulating material, in telescoping arrangement concealing said switch means and providing an operating hand hold.

2. An electrode holder for arc welding comprising a rigid metal arm having an electrode-engaging jaw at one end, a relatively short metal link arm having at its outer end a jaw to cooperate with the first jaw, a pivotal mounting arranged intermediate the ends of said short link arm and connecting the same to said rigid arm, a second link arm having its outer end pivoted to the inner end of said first link arm, a pivotal mounting arranged intermediate the ends of said second link arm and connecting the same to said rigid arm, whereby said links cooperate to form a toggle, thereby positively to maintain the jaws in operative position or in inoperative spread-apart position when said rigid metal arm and said second link arm are moved towards one another or spread apart, respectively, an insulating support on said second link arm adjacent the inner end thereof and disposed on the side thereof adjacent said rigid metal arm, a first spring metal switch arm mounted on said insulating support, means for connecting said first spring metal switch arm to a source of electrical current, a second spring metal arm metallically connected on said rigid metal arm adjacent the inner end thereof and disposed on the side thereof adjacent said second link arm, said spring metal switch arms being arranged to contact one another when said rigid metal arm and said second link arm are moved together for toggling said jaws into operative position, and insulating grips on said rigid metal arm and said second link arm.

3. The combination claimed in claim 2, said insulating grips comprising insulating sheaths substantially U-shaped in cross-section and respectively fitting over said rigid metal arm and over the entire length of said second link arm whereby to shield said switch arms, the free edges of said sheaths telescoping with one another whereby to permit said rigid metal arm and said second link arm to close towards one-another.

GEORGE P. LOUCKS.

REFERENCES CITED

The following references are of record in the file of this patent:

UNITED STATES PATENTS

| Number | Name | Date |
|---|---|---|
| 1,340,270 | Jahoda | May 18, 1920 |
| 1,438,497 | Jones | Dec. 12, 1922 |
| 2,128,799 | Chapman | Aug. 30, 1938 |
| 2,179,497 | Davitow | Nov. 14, 1939 |
| 2,236,849 | Hackmeyer | Apr. 1, 1941 |
| 2,265,135 | Hackmeyer | Dec. 9, 1941 |
| 2,267,297 | Campbell | Dec. 23, 1941 |
| 2,276,549 | Shellabargh | Mar. 17, 1942 |
| 2,327,368 | Olson | Aug. 24, 1943 |
| 2,389,559 | Smith | Nov. 20, 1945 |
| 2,405,406 | Combridge | Aug. 6, 1946 |
| 2,407,836 | Ketelbey et al. | Sept. 17, 1946 |
| 2,411,652 | Garibay | Nov. 26, 1946 |

FOREIGN PATENTS

| Number | Country | Date |
|---|---|---|
| 425,225 | Great Britain | Mar. 7, 1935 |